(12) United States Patent
Page, Jr. et al.

(10) Patent No.: US 6,220,519 B1
(45) Date of Patent: Apr. 24, 2001

(54) SANITARY STEAM TRAP

(75) Inventors: George W. Page, Jr., Cornwall; Dan W. Cole, Walden, both of NY (US)

(73) Assignee: Watts Investment Company, Wilmington, DE (US)

( * ) Notice: Subject to any disclaimer, the term of this patent is extended or adjusted under 35 U.S.C. 154(b) by 0 days.

(21) Appl. No.: 09/431,332

(22) Filed: Nov. 1, 1999

(51) Int. Cl.⁷ ........................................................ F16T 1/02
(52) U.S. Cl. ............................................ 236/58; 236/93 A
(58) Field of Search .............................. 236/56, 58, 93 A, 236/99 J

(56) References Cited

U.S. PATENT DOCUMENTS

| | | |
|---|---|---|
| 1,548,900 | 8/1925 | Parks . |
| 2,807,421 * | 9/1957 | Carlson, Jr. ............................ 236/56 |
| 2,914,251 * | 11/1959 | Morgan .................................. 236/56 |
| 2,936,772 | 5/1960 | Kinderman ........................... 137/183 |
| 4,134,541 | 1/1979 | Beatty ..................................... 236/56 |
| 4,288,032 | 9/1981 | Hetz ....................................... 236/56 |
| 4,387,732 | 6/1983 | Hetz ..................................... 137/183 |
| 4,484,594 | 11/1984 | Alderman ............................. 137/62 |
| 5,088,518 | 2/1992 | Stamatakis et al. ................. 137/171 |
| 5,445,187 * | 8/1995 | Farquhar ............................. 137/182 |

* cited by examiner

*Primary Examiner*—Corrine McDermott
*Assistant Examiner*—Mohammad M. Ali
(74) *Attorney, Agent, or Firm*—Fish & Richardson P.C.

(57) ABSTRACT

A thermostatic steam trap for use in sanitary environments has a steam trap body defining a steam trap cavity and consisting of an inlet body portion defining an inlet port in communication with an inlet cavity portion and an outlet body portion defining an outlet port in communication with an outlet cavity portion. The inlet and outlet cavity portions are disposed in communication to define the steam trap cavity. A centering member is disposed generally between the inlet and outlet body portions. A thermostatic bellows/plug assembly mounted to the centering member moves within the steam trap cavity between a first position in engagement with a seat defined by the steam trap body, thereby to resist flow of fluid between the steam trap cavity and the outlet port, and a second position spaced from engagement with the seat, thereby to permit flow of fluid between the steam trap cavity and the outlet port. A sanitary seal releasably secures together the inlet and outlet body portions at an interface, with the inlet and outlet cavity portions arranged in communication and generally along the vertical axis, with the centering member secured therebetween.

10 Claims, 3 Drawing Sheets

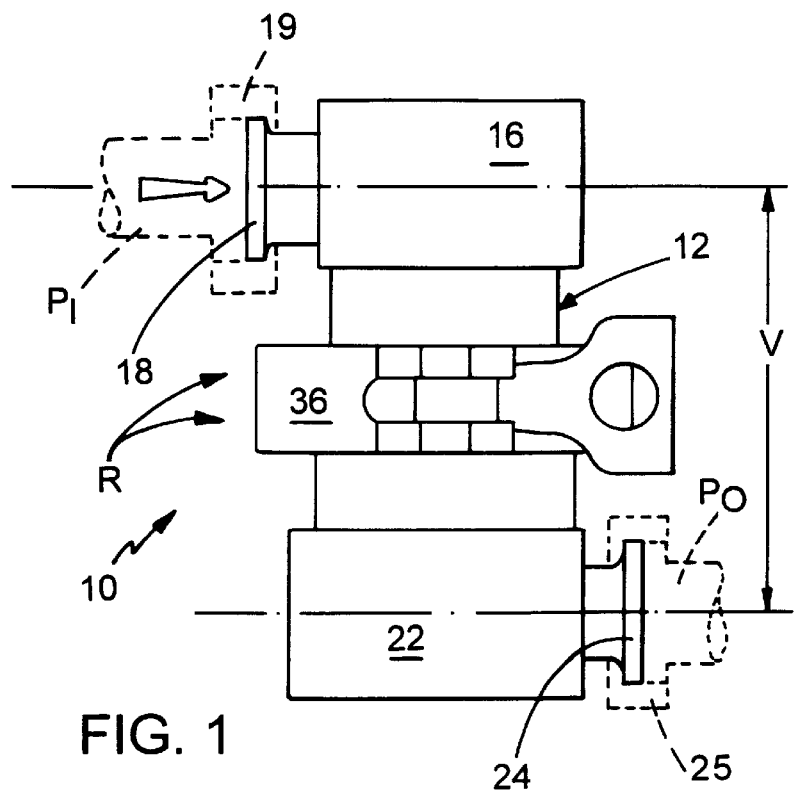
FIG. 1
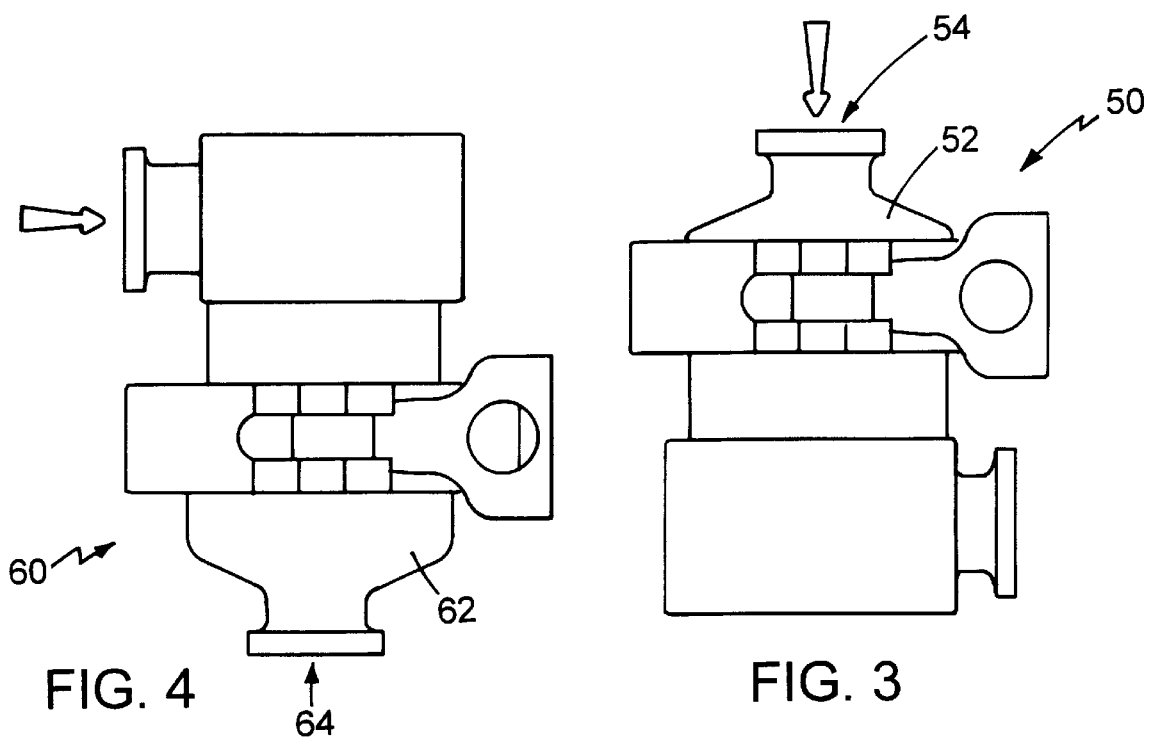
FIG. 4
FIG. 3

SANITARY STEAM TRAP

BACKGROUND OF THE INVENTION

Prior art thermostatic steam traps are, typically, vertical units which must incorporate an inlet elbow and an outlet elbow for horizontal applications and thus have a substantial inlet-to-outlet vertical dimension.

SUMMARY OF THE INVENTION

According to the invention, a thermostatic steam trap for use in sanitary environments comprises a steam trap body defining a steam trap cavity. The steam trap body comprises an inlet body portion defining an inlet port in communication with an inlet cavity portion, and an outlet body portion defining an outlet port in communication with an outlet cavity portion, the inlet cavity portion being disposed in communication with the outlet cavity portion to define the steam trap cavity. A centering member is disposed generally between the inlet body portion and the outlet body portion. A thermostatic bellows/plug assembly mounted to the centering member is adapted to move within the steam trap cavity, generally along a vertical steam trap axis, between a first position in engagement with a seat defined by the steam trap body, thereby to resist flow of fluid between the steam trap cavity and the outlet port, and a second position spaced from engagement with the seat, thereby to permit flow of fluid between the steam trap cavity and the outlet port. A sanitary seal releasably secures together the inlet body portion and the outlet body portion at an interface, with the inlet cavity portion and the outlet cavity portion arranged in communication and generally along the vertical steam trap axis, with the centering member secured therebetween.

Preferred embodiments of the invention may include one or more of the following additional features. The inlet port or the outlet port is generally horizontal, or the inlet and outlet ports are generally horizontal, for direct connection of the steam trap between an inlet pipe and an outlet pipe of generally horizontal piping, without elbows. The steam trap body defines a bypass passageway about the seat, thereby to permit continuous draining of fluid from the steam trap cavity, i.e., for fail-open protection. The bellows is adapted to move in response to fluid temperature in the steam trap cavity, to trap steam in the first position and to exhaust condensate in the second position, the steam having a relatively higher temperature than the condensate. The outlet cavity portion is defined by an outlet body portion wall that tapers inwardly from the interface, the outlet body portion wall defining the seat. The inlet body portion defines a sanitary connection ferrule in a region of the inlet port, and/or the outlet body portion defines a sanitary connection ferrule in a region of the outlet port. The inlet body portion and the outlet body portion each defines a respective cooperating sanitary connection ferrule in a region of the interface. The inlet body portion and the outlet body portion are relatively rotatable in a plane of the interface, e.g. the inlet body portion and the outlet body portion are relatively rotatable to accommodate full 360° rotation. The thermostatic steam trap has an inlet-axis-to-outlet-axis vertical dimension of less than about 3 inches, and preferably less than about 2.85 inches, for standard ½-inch and ¾-inch sanitary fittings and clamps, with each of the inlet body portion and the outlet body portion being integrally made with polished, sanitary surface finishes, and clamps at sanitary connection ferrules at the inlet port, the outlet port and the interface having clearance for tightening without interengagement.

The invention thus provides a thermostatic steam trap for use in sanitary environments, with integral horizontal inlet and outlet ports used in conjunction with a thermostatic bellows/plug assembly designed for free draining flow, without puddling, even in significantly sloped lines with minimal vertical clearance.

Other features and advantages will be apparent from the following description of a presently preferred embodiment, and from the claims.

BRIEF DESCRIPTION OF THE DRAWINGS

FIG. 1 is a side view of a thermostatic steam trap for use in sanitary environments of the invention.

FIGS. 3 and 4 are side views of other embodiments of thermostatic steam traps for use in sanitary environments of the invention.

DESCRIPTION OF THE PREFERRED EMBODIMENTS

Figure 2:
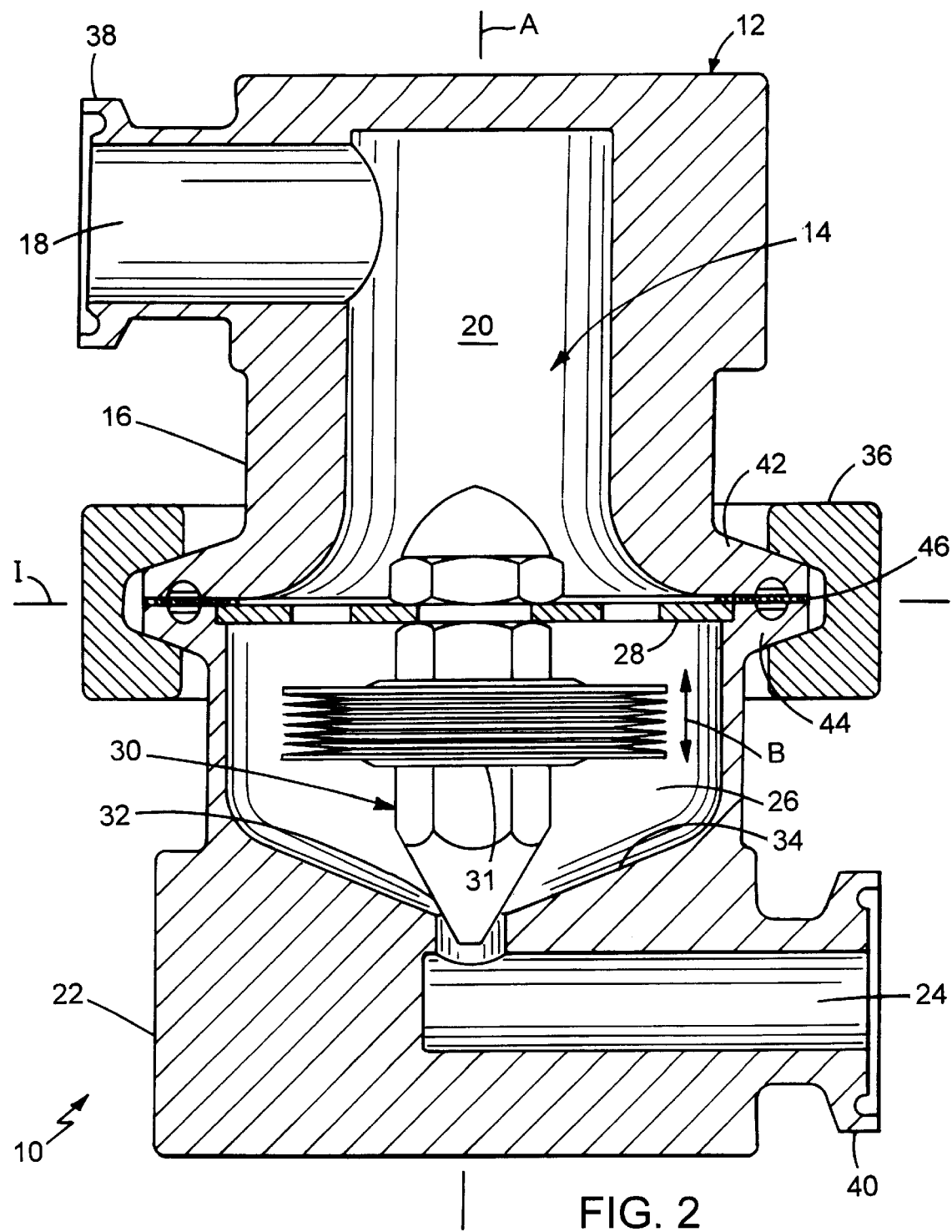
FIG. 2 is a side section view of the thermostatic steam trap for use in sanitary environments of FIG. 1.

Referring to FIGS. 1 and 2, a thermostatic steam trap 10 of the invention for use in sanitary environments has a steam trap body 12 defining a steam trap cavity 14. The steam trap body 12 consists of an inlet body portion 16 defining an inlet port 18 in communication with an inlet cavity portion 20, and an outlet body portion 22 defining an outlet port 24 in communication with an outlet cavity portion 26. The inlet cavity portion 20 and outlet cavity portion 26 are disposed in communication to define, together, the steam trap cavity 14. A centering member or plate 28 is disposed generally between the inlet body portion 16 and the outlet body portion 22, with a thermostatic bellows/plug assembly 30, including a bellows 31, concentrically mounted thereto. The thermostatic bellows/plug assembly 30 is adapted to move (arrow, B) within the steam trap cavity 14, generally along a vertical steam trap axis, A, between a first position in engagement with a seat 32 defined by the steam trap body 12 (as shown in FIG. 2), thereby to resist flow of fluid between the steam trap cavity 14 and the outlet port 24, and a second position spaced from engagement with the seat 32, thereby to permit flow of fluid between the steam trap cavity 14 and the outlet port 24. Preferably, the bellows 31 is filled with a fluid that causes the bellows 31 to expand and contract with change of temperature of the fluid in the steam trap cavity 14. In particular, the bellows 31 expands at higher temperatures to trap steam in the first position and the bellows 31 contracts at relatively lower temperatures to exhaust condensate in the second position, the steam having a relatively higher temperature than the condensate.

The outlet cavity portion 26 is defined by an outlet body portion wall 34 which tapers inwardly to define the seat 32. A sanitary seal 36 releasably secures together the inlet body portion 16 and the outlet body portion 22 at an interface 46, with the inlet cavity portion 20 and the outlet cavity portion 26 arranged generally along the vertical steam trap axis, A, and in communication, and the centering plate 28 secured therebetween.

In preferred embodiments, the inlet port 18 and the outlet port 24 are both generally horizontal, for direct connection of the steam trap 10 between an inlet pipe, $P_I$, and an outlet pipe, $P_O$ (both shown in dashed lines in FIG. 1), i.e., without requiring elbows. This provides a thermostatic steam trap 10 having an inlet-axis-to-outlet-axis vertical dimension, V, e.g., about 2.81 inches, which is smaller than typical prior art vertical traps with elbows. This dimension is for standard ½-inch and ¾-inch sanitary fittings and clamps, where each of the inlet body portion 16 and the outlet body portion 22 are made from a single piece of metal without welds leaving unpolished, unsanitary surface finishes, and clamps 19, 25 at the inlet and outlet ports 18, 24, respectively, and clamp 36 at the interface 46 can be tightened without coming into contact with each other.

The inlet body portion 16 defines a horizontal sanitary (i.e., non-threaded) connection ferrule 38 in a region of the inlet port 18, and the outlet body portion 22 defines a horizontal sanitary (i.e., non-threaded) connection ferrule 40 in a region of the outlet port 24. The inlet body portion 16 and the outlet body portion 22 each defines a respective cooperating vertical sanitary (i.e., non-threaded) connection ferrule 42, 44, respectively, in a region of the interface 46.

The sanitary ferrule connections or fittings permit substitution of different inlet body portions and outlet body portions, which allows attachment of the thermostatic steam trap of the invention to either horizontal or vertical inlets and outlets. For example, referring to FIG. 3, thermostatic steam trap 50 has an inlet body portion 52 with a vertical inlet port 54, and, referring to FIG. 4, thermostatic steam trap 60 has an outlet body portion 62 with a vertical outlet port 64.

Referring again also to FIGS. 1 and 2, the cooperating sanitary ferrule connections 42, 44 of the inlet body portion 16 and the outlet body portion 22, respectively, at the interface 46 also allow the inlet body portion 16 and the outlet body portion 22 to be relatively rotatable (arrow, R), e.g. to accommodate full 360° rotation, in a plane, I, of the interface 46, as piping requirements dictate.

The sanitary (non-threaded) connection ferrules also permit ease of disassembly, e.g., for cleaning, and free draining flow without puddling, even in significantly sloped lines.

Figure 5:
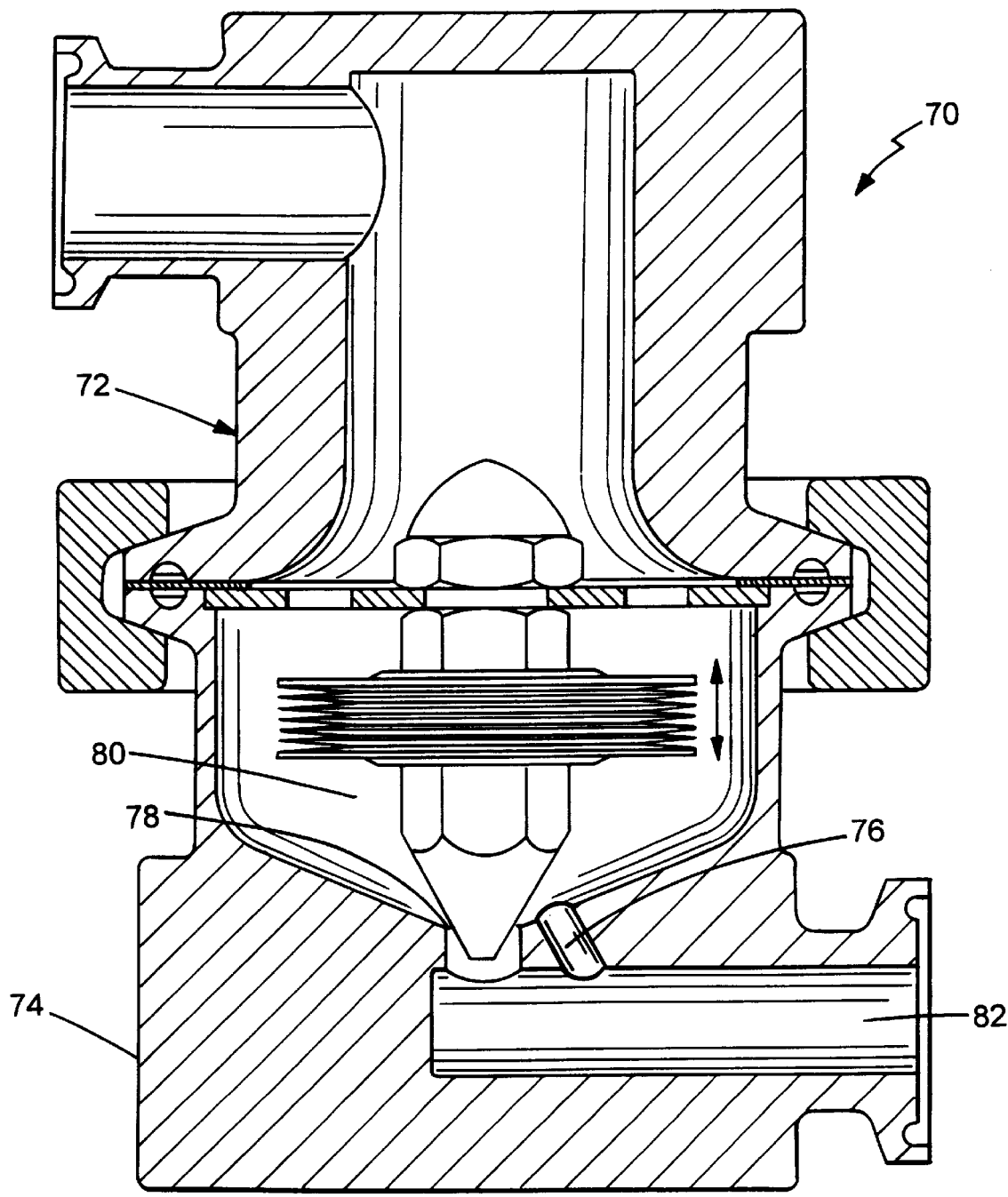
FIG. 5 is a side section view of yet another embodiment of a thermostatic steam trap for use in sanitary environments of the invention, with a continuous bypass passage.

Other embodiments are within the following claims. For example, referring now to FIG. 5, in a thermostatic steam trap assembly 70 of the invention, the steam trap body 72, and, more particularly, the outlet body portion 74, defines a bypass passageway 76 about the seat 78, thereby to permit continuous draining of fluid from the steam trap cavity 80 to the outlet port 82, and provide a fail-open design.

What is claimed is:

1. A thermostatic steam trap for use in sanitary environments, comprising:
    a steam trap body defining a steam trap cavity said steam trap body comprising:
        an inlet body portion defining an inlet port in communication with an inlet cavity portion, and
        an outlet body portion defining an outlet port in communication with an outlet cavity portion,
            said inlet cavity portion disposed in communication with said outlet cavity portion to define said steam trap cavity,
    a centering member disposed generally between said inlet body portion and said outlet body portion,
    a thermostatic bellows/plug assembly mounted to said centering member, said thermostatic bellows/plug assembly adapted to move within said steam trap cavity, generally along a vertical steam trap axis, between a first position in engagement with a seat defined by said steam trap body, thereby to resist flow of fluid between said steam trap cavity and said outlet port, and a second position spaced from engagement with said seat, thereby to permit flow of fluid between said steam trap cavity and said outlet port, and
    a sanitary seal releasably securing together said inlet body portion and said outlet body portion at an interface, with said inlet cavity portion and said outlet cavity portion arranged in communication and generally along said vertical steam trap axis, with said centering member secured therebetween; and
    wherein said thermostatic steam trap has an inlet-axis-to-outlet-axis vertical dimension of less than about 3 inches for standard ½-inch and ¾-inch sanitary fittings and clamps, with each of said inlet body portion and said outlet body portion being integrally made with polished, sanitary surface finishes, and clamps at sanitary connection ferrules at said inlet port, said outlet port and said interface having clearance for tightening without interengagement.

2. The thermostatic steam trap for use in sanitary environments of claim 1, wherein said inlet port is generally horizontal.

3. The thermostatic steam trap for use in sanitary environments of claim 1, wherein said outlet port is generally horizontal.

4. The thermostatic steam trap for use in sanitary environments of claim 1, wherein said inlet port and said outlet port are generally horizontal, for direct connection of said steam trap between an inlet pipe and an outlet pipe of generally horizontal piping.

5. The thermostatic steam trap for use in sanitary environments of claim 1, wherein said steam trap body defines a bypass passageway about said seat, thereby to permit continuous draining of fluid from said steam trap cavity.

6. The thermostatic steam trap for use in sanitary environments of claim 1, wherein said bellows is adapted to move in response to fluid temperature in said steam trap cavity, to trap steam in said first position and to exhaust condensate in said second position, the steam having a relatively higher temperature than the condensate.

7. The thermostatic steam trap for use in sanitary environments of claim 1, wherein said outlet cavity portion is defined by an outlet body portion wall tapering inwardly from said interface, said outlet body portion wall defining said seat.

8. The thermostatic steam trap for use in sanitary environments of claim 1, wherein said inlet body portion and said outlet body portion are relatively rotatable in a plane of said interface.

9. The thermostatic steam trap for use in sanitary environments of claim 8, wherein said inlet body portion and said outlet body portion are relatively rotatable to accommodate full 360° rotation.

10. The thermostatic steam trap for use in sanitary environments of claim 1, wherein said inlet-axis-to-outlet-axis vertical dimension of less than about 2.85 inches.

* * * * *